US009074901B1

(12) United States Patent
Subramanian et al.

(10) Patent No.: US 9,074,901 B1
(45) Date of Patent: Jul. 7, 2015

(54) SYSTEM AND METHOD FOR AUTOMATICALLY GENERATING AN ELECTRONIC JOURNAL

(75) Inventors: Sowmya Subramanian, San Francisco, CA (US); Leif Hendrik Wilden, Belmont, CA (US); Keith Patrick Golden, San Francisco, CA (US)

(73) Assignee: Google Inc., Mountain View, CA (US)

( * ) Notice: Subject to any disclaimer, the term of this patent is extended or adjusted under 35 U.S.C. 154(b) by 785 days.

(21) Appl. No.: 13/241,121

(22) Filed: Sep. 22, 2011

(51) Int. Cl.
*G01S 5/00* (2006.01)
*G01C 21/28* (2006.01)
*G08G 1/00* (2006.01)

(52) U.S. Cl.
CPC . *G01C 21/28* (2013.01); *G08G 1/20* (2013.01)

(58) Field of Classification Search
CPC .... G01C 21/28; G01C 21/3679; G01C 21/34; G01F 21/28; G01F 21/3679; H04W 4/023; H04W 4/028; H04W 4/04; G08G 1/20; G01S 5/052
USPC ......... 701/521, 439; 455/456.1–456.3, 404.2, 455/414.1
See application file for complete search history.

(56) References Cited

U.S. PATENT DOCUMENTS

| | | | |
|---|---|---|---|
| 7,881,864 B2 * | 2/2011 | Smith | 701/439 |
| 8,719,198 B2 * | 5/2014 | Zheng et al. | 706/21 |
| 2004/0019606 A1 * | 1/2004 | Ackerman et al. | 707/104.1 |
| 2005/0278371 A1 * | 12/2005 | Funk et al. | 707/102 |
| 2007/0136275 A1 * | 6/2007 | Wan | 707/5 |
| 2008/0298766 A1 * | 12/2008 | Wen et al. | 386/46 |
| 2010/0035631 A1 * | 2/2010 | Doucette et al. | 455/456.1 |
| 2010/0046842 A1 * | 2/2010 | Conwell | 382/218 |
| 2010/0205176 A1 * | 8/2010 | Ji et al. | 707/737 |
| 2010/0245625 A1 * | 9/2010 | Gallagher et al. | 348/231.5 |
| 2011/0087666 A1 * | 4/2011 | Chou et al. | 707/737 |
| 2014/0153837 A1 * | 6/2014 | Steiner | 382/218 |

OTHER PUBLICATIONS

Luo et al., "Geotagging in multimedia and computer vision—a survey", Multimed Tools Appl, 2011, pp. 187-211, vol. 51.
Zheng et al., "GeoLife: Building social networks using human location history", Microsoft Research, retrieved from <http://research.microsoft.com/en-us/projects/geolife/>, Oct. 14, 2011.

* cited by examiner

*Primary Examiner* — Marthe Marc-Coleman
(74) *Attorney, Agent, or Firm* — Dority & Manning, P.A.

(57) ABSTRACT

A system and method of the subject technology automatically generates an electronic journal of a series of events based on input from data sources already used to record the series of events, and then displays those events in an electronic publication representative of the series of events. A GPS track may be used in connection with the series of events to generate the electronic journal in connection with an interactive map.

25 Claims, 6 Drawing Sheets

SYSTEM AND METHOD FOR AUTOMATICALLY GENERATING AN ELECTRONIC JOURNAL

TECHNICAL FIELD

The subject technology relates generally to electronic publications, namely a system and method for automatically generating an electronic journal.

BACKGROUND

Electronic journals include online publications that provide commentary or news on a particular subject over a period of time, for example, to chronicle a trip or vacation. Such journals may be maintained in a blog format wherein an author manually creates entries for a series of events to be displayed in reverse-chronological order. Updating a blog often requires a great deal of manual compilation including input and transfer of data from the various data sources used to record the events (for example, digital cameras, GPS location trails, tweets, and the like). Moreover, a blog format is not always suited for portraying a realistic narration of a sequential series of events. A reader of a blog is often forced to discern the sequence and/or nature of the relationship between posted events by scrolling along the length of the blog on a single display.

SUMMARY

The subject technology provides a computer implemented method of generating an electronic journal. In some aspects, the method includes receiving GPS location data from one or more data devices, determining a travel route from the GPS location data, receiving one or more data recordings (for example, one or more digital images, videos, text messages, and/or the like) from the one or more data devices, extracting meta-data (for example, a timestamp) from the one or more data recordings, correlating the meta-data with the travel route to generate one or more travel events, each travel event including one or more respective data recordings associated with a location on the travel route.

In one aspect, the method may include providing an interactive map including the travel route and one or more event representations positioned along the travel route, each of the event representations operable to, when selected, display one or more respective travel events. In another aspect, the method may include generating a chronological storyline representative of the one or more travel events along the travel route and operable to be displayed in combination with an interactive map representative of the travel route, wherein the chronological storyline displays at least one of the one or more data recordings in connection with displaying the one or more travel events.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The subject technology provides a system and method for automatically generating an electronic journal. In this regard, the system and method may infer user activities from data collected from devices and/or data sources already used to record the details of the activities (for example, digital cameras, smart phones, GPS devices, and the like), and generate a chronological diary of user activities at specific places over a period of time (for example, during a trip).

For example, a user on a trip through the Himalaya mountains may, at certain times, take digital photos, videos, and post messages to a blog or social network during the trip. At the same time, a location-aware device (for example, a GPS-enabled smart phone) may collect location data (for example, GPS position information, latitude and longitude coordinates, altitude information, cartography data, or the like). Using the subject technology, the various recorded data may be collected during or at the end of the trip from the disparate data sources and used to generate an electronic journal that portrays a chronological storyline of the trip. In one aspect, a virtual travel route (for example, path) may be generated from the collected location data and displayed in connection with an interactive map. The virtual travel route may be integrated with the other recorded data (for example, digital photos, video, text messages, and the like) via a user interface to generate a visual representation of the user's experience along the route taken during the trip. Thus, with a few clicks at the user interface, the data may be automatically assembled into a chronological series of events that visually portrays a user's activities along a travel route, together with text, pictures and video.

A device configured according to the subject technology may also be configured by the user to automatically send the recorded data to a centralized location over a selected period of days as part of the collection process. For example, during a trip, a smart phone may be configured to record and store location data, along with pictures, video, and/or text messages produced over a selected time frame, for the purpose of creating an electronic journal. The electronic journal may then be compiled from the data, by software executed on the smart phone or at a location associated with the stored data, at any point during the trip or at its completion.

Figure 1:
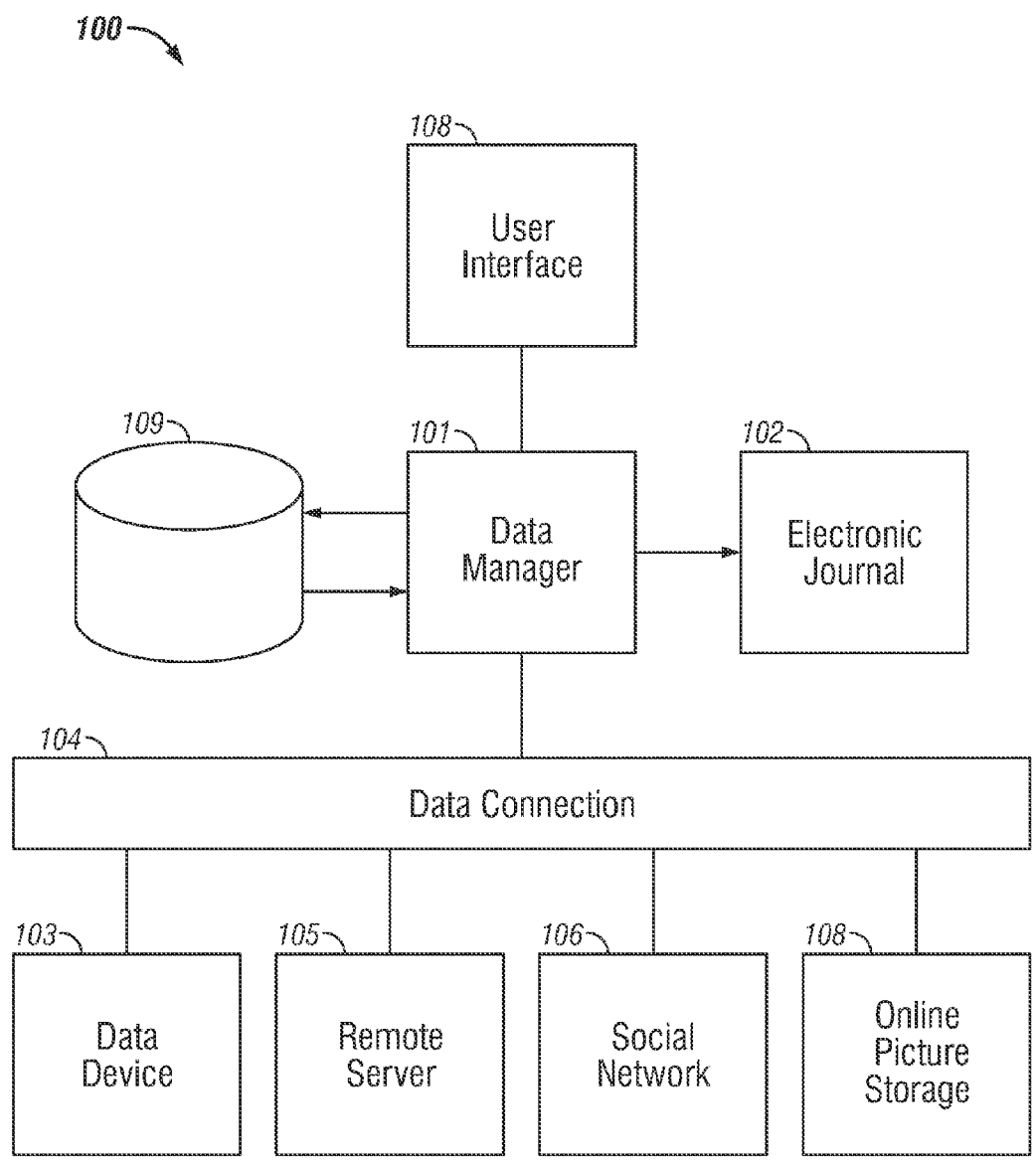
FIG. 1 is an exemplary diagram of a system for automatically generating an electronic journal, including a user interface and a data manager for managing a variety of data, according to one aspect of the subject technology.

FIG. 1 is an exemplary diagram of a system for automatically generating an electronic journal, including a user interface and a data manager for managing a variety of data, according to one aspect of the subject technology. System 100 includes a data manager 101 for generating an electronic journal 102 from the integration of one or more data sources. In some aspects, one or more data devices 103 (for example, digital camera, smart phone, GPS device, computer, file server, tablet computer, PDA, or the like) may be connected to data manager 101 via a data connection channel 104. In one aspect, data manager 101 may include a processor configured to execute code or instructions to perform the operations and functionality described herein (see, for example, FIG. 6). In another aspect, data manager 101 may include software executable by a computer-enabled device (for example, a personal computer, tablet computer, server, PDA, smart phone, GPS device, or the like) that, when executed, configures the computer-enabled device to perform the operations and functionality described herein. In one aspect, data connection channel 104 may be a wired connection (for example, a network connection, USB, SATA, FireWire, SCSI, or the like) or a wireless connection (for example, cellular, Bluetooth, or the like).

Other data sources operably connected to data manager 101 may include a remote server 105 (for example, a file server, data cloud, database, web-blog, web-service, or the like), a social network 106 (for example, at Facebook, Twitter, Google Buzz, and the like), online picture storage 107 (for example, Picasa, Flickr, or the like), and/or other systems where data has previously been stored and/or uploaded for other purposes. In some aspects, a user interface 108 may be integrated with data manager 101 to provide a means for the easy collection of the data recorded by the various data sources. In one example, user interface 108 may be aggregated by a data device 103 (for example, on a smart phone) to allow the easy uploading of images and other data recorded by data device 103 to data manager 101 and/or remote data sources (for example, remote server 105). In this regard, data manager 101 may collect GPS location data recorded by a GPS-enabled data device 103, and further integrate with a social network to collect data that was posted to the social network over a period of time. In one aspect, a user may set parameters at user interface 108 to configure data manager 101 to only collect data over a predetermined time frame (for example, May 17-19), and/or to only collect data that is associated with a particular subject or tag. Once collected, the GPS location data and other data may then be combined by data manager 101 to generate electronic journal 102.

In another aspect, data manager 101 (and/or database 109) may be integrated with a data cloud (for example, on a remote server). Recorded data may be uploaded to the cloud from time to time or on a period or real-time basis. Accordingly, data manager 101 may be configured to automatically receive the data without further interaction and/or configuration via user interface 108. For example, a data device 103 (for example, a smart phone) may be integrated with data manager 101 (for example, via software running on the smart phone) and configured to automatically provide GPS location data to data manager 101 while its user is on a trip, and/or over a period of time. In one aspect, data manager 101 may be integrated with disparate data sources such that each time data is stored or posted to those sources the data is automatically transmitted to data manager 101 and included in electronic journal 102. For example, if a user has configured data manager 101 to generate an electronic journal of a mountain climbing trip, each time a message or photo pertaining to mountain climbing is posted to the user's social network page the message or photo may be transmitted to data manger 101.

In some aspects, data manager 101 may be configured to aggregate recorded data that is collected into a series of events that visually portrays a user's activities along a travel route. In this regard, the received GPS location data may include timestamp data that may be associated with timestamp data from the other collected data (for example, digital pictures, video, text messages, blog posts, and the like) recorded at specific points along a route over a period of time. From this data, data manager 101 may generate a virtual trail of location points with each point being associated with one or more photos, videos, text messages, blog posts, or the like.

Figure 2:
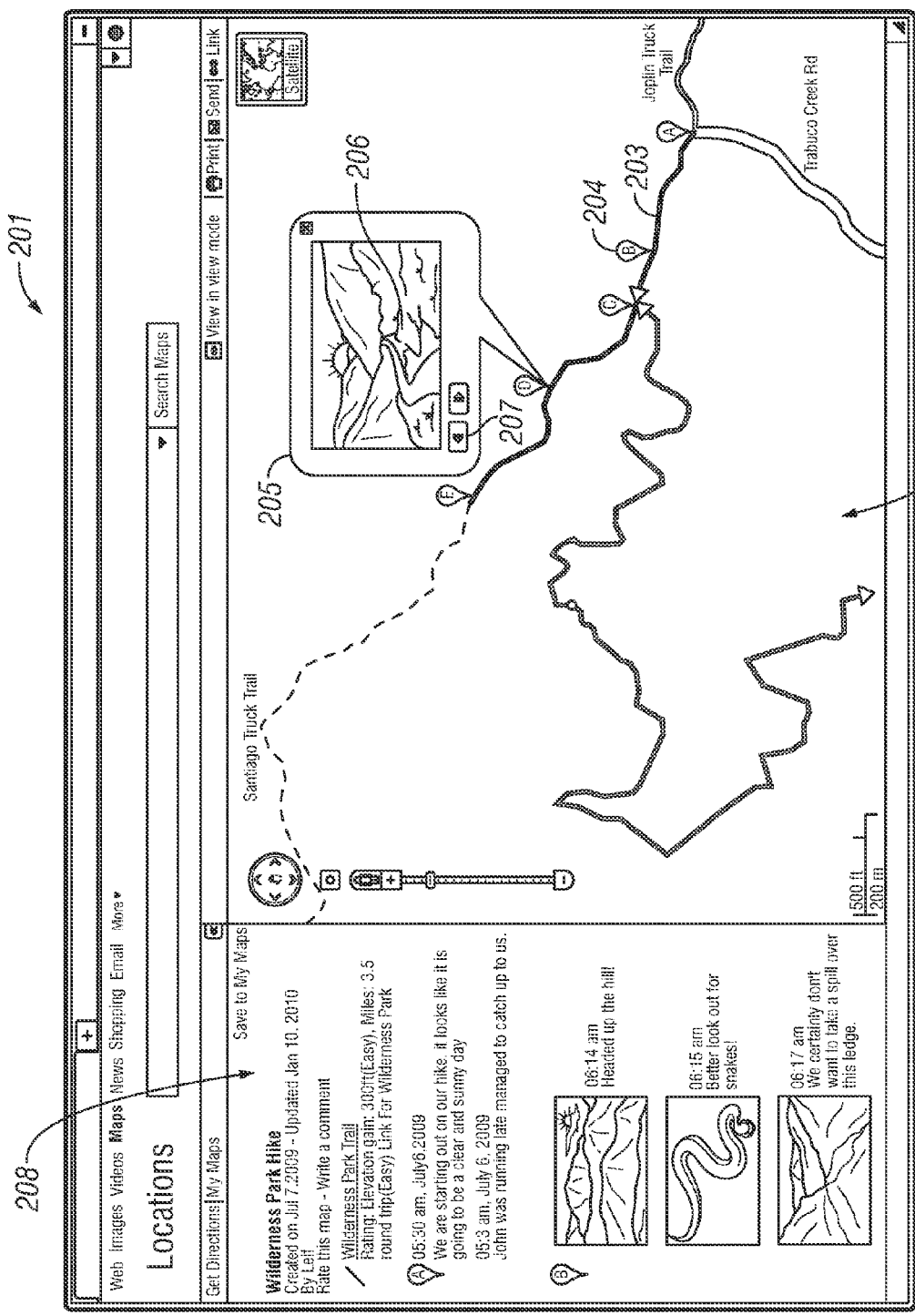
FIG. 2 is an exemplary diagram of an automatically generated electronic journal according to one aspect of the subject technology.

FIG. 2 is an exemplary diagram of an automatically generated electronic publication according to one aspect of the subject technology. In the depicted example, an electronic journal 201 (for example, in an online format) is generated to include an interactive map 202, with a virtual travel route 203 superimposed on interactive map 202. At one or more points along route 203, electronic journal 201 may include a collection of notes, pictures, and or other data arranged as events 204. In one aspect, hovering a pointing device over a representation of an event 204 may cause interactive map 202 to activate and display a dialog 205, including one or more image or video thumbnails 206 and/or text associated with event 204. In one aspect, dialog 205 may include one or more buttons 207 for moving through a series of images or the like within dialog 205. In another aspect, selecting dialog 205 may display a page of details associated with event 205. For example, clicking on dialog 205 with a mouse may cause a webpage to appear that includes all recorded data associated with event 204 in a blog format.

In some aspects, the collected data is compiled to generate an electronic journal 201 having a format of a chronological story, and the chronological story displayed as part of, or in connection with, an interactive map 202. In the depicted example, electronic journal 201 may include multiple components, such as a map perspective 202, event dialogs 205 (including for example, a video stream, text, and/or one or more pictures arranged as a slide show), and/or a blog. In one aspect, a condensed blog 208 may also be displayed in connection with map 202. As in the depicted example, condensed blog 208 may be organized chronologically by event 204 and displayed on a side and apart from map 202, and such that the contents of events 204 are sequentially listed to depict a storyline associated with virtual travel route 203.

Interactive map 202 may be generated by data manager 101, or, in other aspects, may be an interactive internet map generated by a remote server and/or third party (for example, Google Maps, Google Earth, or a geographically accurate virtual world) and integrated by or with data manager 101. Virtual travel route 203 may be constructed from the collected GPS location data, previously described. Virtual travel route 203 may also be constructed from other data. For example, the system may use face recognition and/or location recognition software and/or hardware to determine one or more subjects of stored photos and/or video data. In one example, a photo (for example, a digital picture) of a known location may be processed by location recognition software to generate coordinates of the known location. Those coordinates may then be used or included with coordinates collected from other means (for example, GPS location data, known locations recognized from other photos, manually entered data, or the like) to construct virtual travel route 203.

In further aspects, an event 204 may be determined by comparing collected data with a respective cluster of data having similar features. For example, an event 204 may be determined by one or more data having a similar meta-data (for example, timestamps within a certain delta of each other, captured substantially at the same location, or the like). In another example, an event may be inferred by clusters of photos and/or videos taken of the same subject (for example, determined by computer-enabled image recognition and/or comparison processes). An example subject may include a person's face. System 100 may compare the face to faces recognized in other photos to determine that one or more photos were taken of the same person. In another example, color patterns and/or coordinates received from GPS information may determine that one or more photos are of the same landmark. To this end, an event may be created and information about the landmark may be retrieved (for example, from a database or known online storage location) and included as part of the event. In some aspects, one or more photos may be compared to determine whether they are substantially similar using color patterns and/or color comparisons. Similar photos may then be included as part of an event 204.

System 100 may also be configured to analyze GPS information to determine a mode of transit, and then include that mode of transit in the generation of journal 102, for example, its text and/or its formatting. In one aspect, a GPS track may determine a speed of travel, elevation, whether the user is ascending or descending, and/or method of travel (for example, by boat, land, or by air). For example, on detecting a consistent range of speed over a certain land location (for example, over a trail or rough terrain), data manager 101 may determine the trip was likely to be a bicycle trip. Data manager 101 may then include in journal 102 terms like "ride", "rest stop", "sprint", "climb", and/or "decent" to describe parts of the route. In another example, if the range of speed is at a walking speed through a national park, terms such as, for example, "hike" and "trail" may be used, reserving "climb" for much steeper ascents. In some aspects, journal 102 may include an elevation profile (for example, for hilly terrain). If the trip is determined to be by air, train, or boat, system 100 may attempt to access a known network location (for example, a travel service) to match the GPS track to a known flight, train or vessel having the same or substantially similar route, and include information relevant to the detected transportation. For example, if the trip is determined to match a known path of a cruise ship, the name and photo of the cruise ship may be included as part of journal 102.

Data manager 101 may be further configured to include, for example, in the generation of text, reverse geocodes determined from comparing the GPS track to known geographical locations. In this aspect, names of places or geographic features may be associated with a set of GPS coordinates, and, for example, stored in a database 109 for retrieval by data manager 101. In generating a chronological story for a bicycling trip, a day trip may be characterized as "a ride around Lake Merced" or "a ride up Mount Tam." A multi-week bike tour might be characterized as "a tour from Seattle to San Diego," and an individual day might be presented as "Day 3: Astoria to Cape Lookout State Park." The characterizations may be included in an event 204, or may characterize a series of events 204 or a group of activities over a certain time period, or the like.

FIG. 2 is merely representative of one style of electronic journal 201 that may be generated using the subject technology. In other aspects, the data collected by data manager 101 may be compiled into three-dimensional mapping code (for example, KML) for rendering a three-dimensional geographical tour (for example, Google Earth tour) whereby a camera may fly from point to point, showing recorded visual data (for example, pictures, video, text, and/or event dialog 205) at each point. In a further aspect, electronic journal 201 may include a book format, including a map overview on a first page, and an event 204, or a day of activities, represented by each subsequent page. Those skilled in the art will recognize that other electronic journal formats may be generated by data manager 101 without departing from the scope of the subject technology. In a further aspect, electronic journal 201 may include a link 207 for switching between map styles and/or journal formats.

Figure 3:
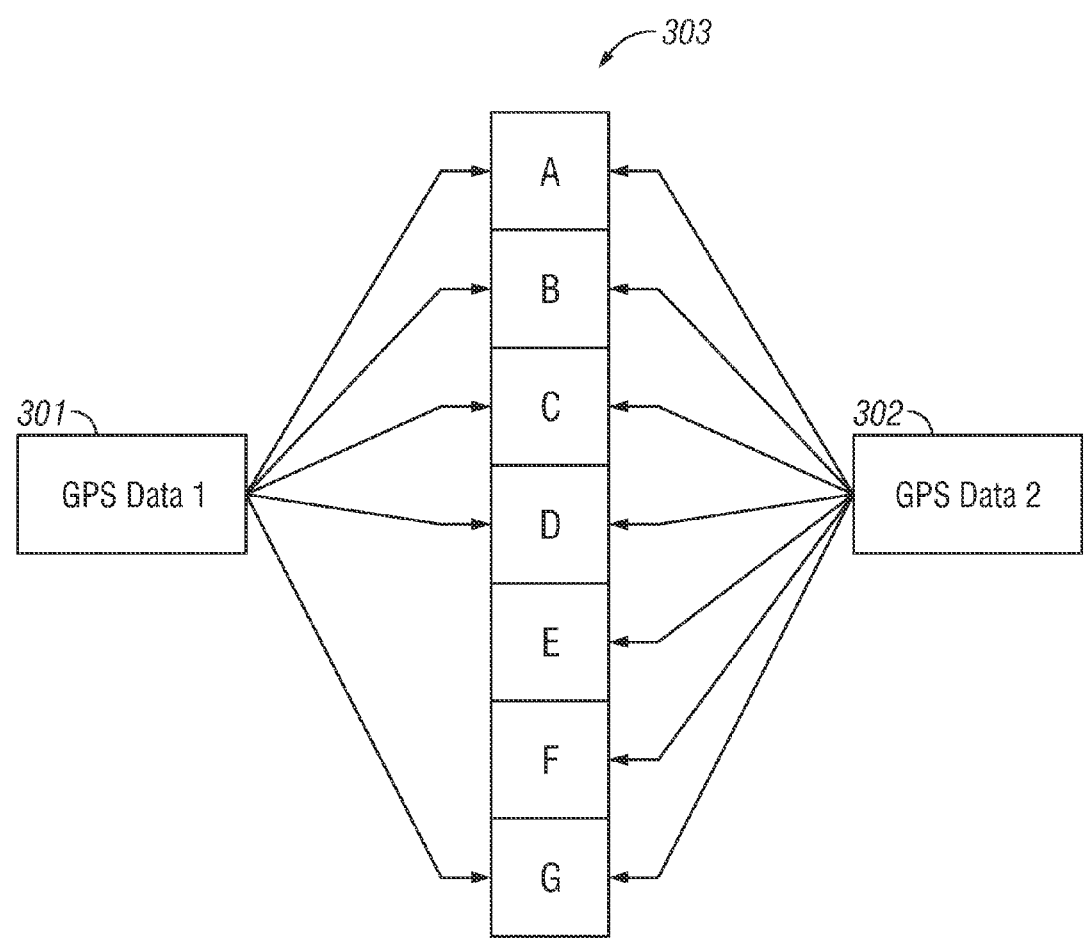
FIG. 3 is an exemplary diagram of associating GPS data from multiple journal authors according to one aspect of the subject technology.

FIG. 3 is an exemplary diagram of associating GPS data from multiple journal authors according to one aspect of the subject technology. Data manager 101 may enable the collaboration of multiple users to participate in the same electronic journal based on similar collected data. In one aspect, data manager 101 may determine a confidence level that two or more users are on a joint adventure (and/or interacting together) based, in part, on manual association at user interface 108, similar GPS patterns, the number of photos taken at a specific location and/or at a particular time, and/or the like. In the depicted example, the system may determine that a first traveling user using a first data source 301 and a second traveling user using a second data source 302 are on a joint adventure based on GPS data 303 collected from the first and second data sources. Data source 301 may determine that the first user travelled from point A to G, passing through points C and D. Likewise, data source 302 may determine that the second user travelled from point A to G, passing through points B, D, E, F, and G. If common points A, D, and G were visited at substantially the same time, an initial confidence level may be determined that both users were on a joint adventure. In one aspect, the confidence level may be increased as more common data points and times become available. In another aspect, the system may also use a text classifying system (for example, similar to that used to detect spam) and/or image recognition software to determine similarity or non-similarity between text and/or image data generated by two or more users to determine a higher or lower confidence level.

Once a joint adventure is determined, the system and method may use a first user's data to substitute for the temporary loss of data from a second user. For example, the second user's GPS signal may be lost or turned off during a trip. Based on similar patterns recognized from other collected data (for example, GPS and/or photo data from the first user), data manager 101 may fill in GPS coordinates and/or storylines for the data omitted during the period of time the data connection or information was lost. With reference to the depicted example, it may be unknown whether the first user travelled through points B, E, and F (due to loss of signal, shutdown of the GPS device, or the like). If a joint reference has been determined to include the first and second users between point A and point G, then a high confidence level may be determined that the first user also stopped at points B, E, and F. Accordingly, data from second source 302 may be used to supplement data from first source 301 and vice versa when generating the interactive map (for example, map 202) and/or its associated chronological story.

Figure 4:
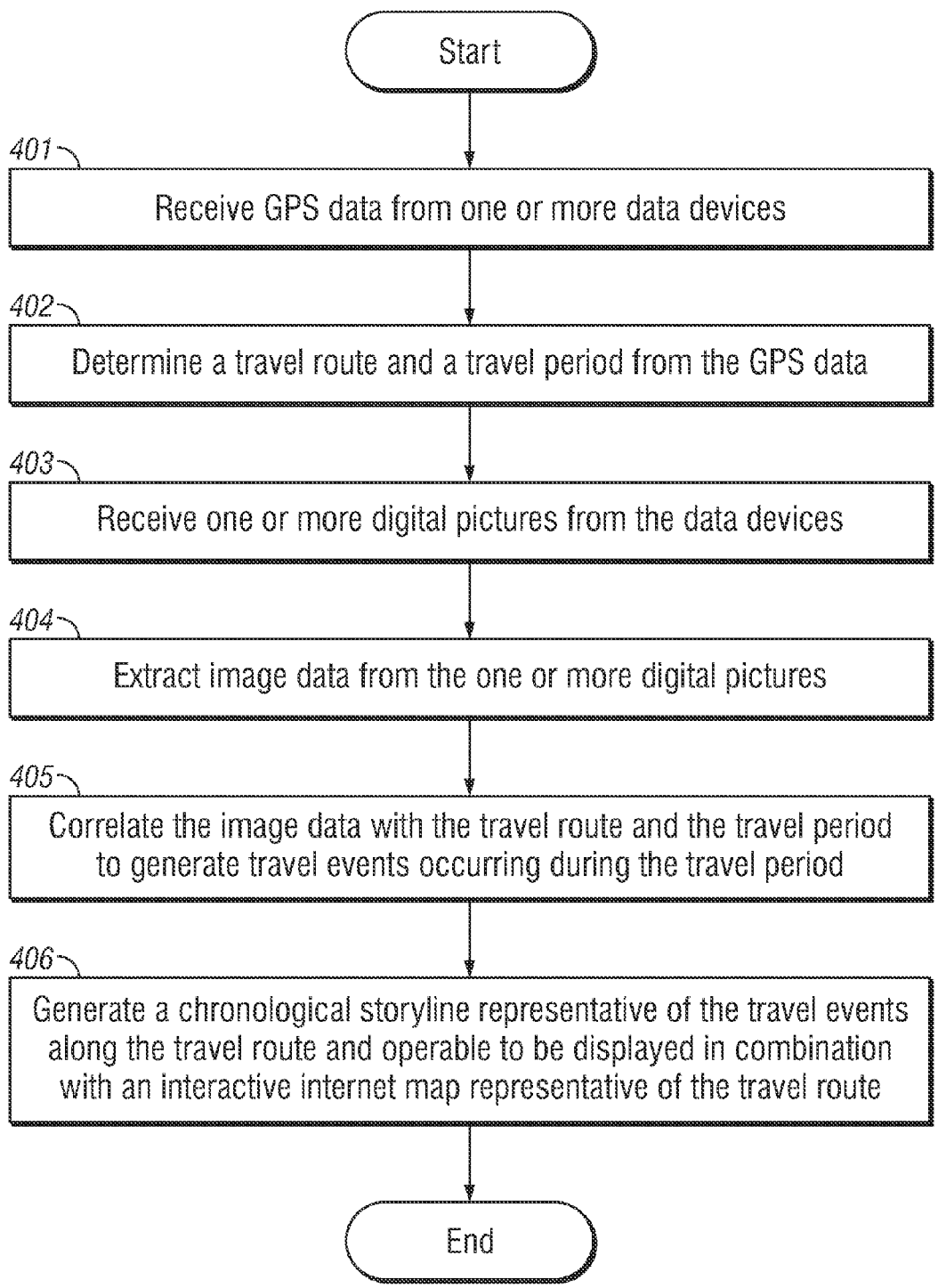
FIG. 4 is a flowchart illustrating a process for generating an interactive journal according to one aspect of the subject technology.

FIG. 4 is a flowchart illustrating a process for generating an interactive journal according to one aspect of the subject technology. In step 401, GPS data is received by the system from one or more data devices. As described previously, GPS data may be manually entered, received over a wired connection from one or more data devices, received from one or more third-party servers, received from a central database, or the like. In step 402, a travel route and a travel period is determined from the GPS data. The travel route may include a virtual trail of location points (for example, virtual travel route 203), and the travel period may be determined from the starting time and ending time of the travel route, or segment thereof. In step 403, the system receives one or more digital pictures (for example, digital images or videos) from one or more data devices. It is not necessary that the digital pictures be received in any particular order. It is also not necessary that the digital pictures be received prior to determining the travel route and/or travel period. In some aspects, the digital pictures (and/or other data such as text messages) may be stored in a cloud or retrieved from third-party service providers (for example, a social network or online picture site).

In step 404, image data is extracted from the one or more digital pictures. The image data may include one or more timestamps, each corresponding to a respective picture. In step 405, the image data is correlated with the travel route and the travel period to generate one or more travel events occurring during the travel period. In one aspect, this may be done by matching a timestamp associated with a digital picture to a timestamp associated with a GPS location data point. In another aspect, this may be done by determining that the timestamps of a plurality of images fall within substantially the same time period, and then matching the time period with one or more GPS location data points. In step 405, a chronological storyline is generated. The chronological storyline may be representative of the one or more travel events along the travel route and operable to be displayed in combination with an interactive map that includes the travel route. In one aspect, as illustrated by FIG. 2, the chronological storyline may display at least one digital picture in connection with displaying the one or more travel events 204 (for example, in blog 206, and/or in a graphical dialog 205 activated by clicking on a graphic representation of the event 204).

Figure 5:
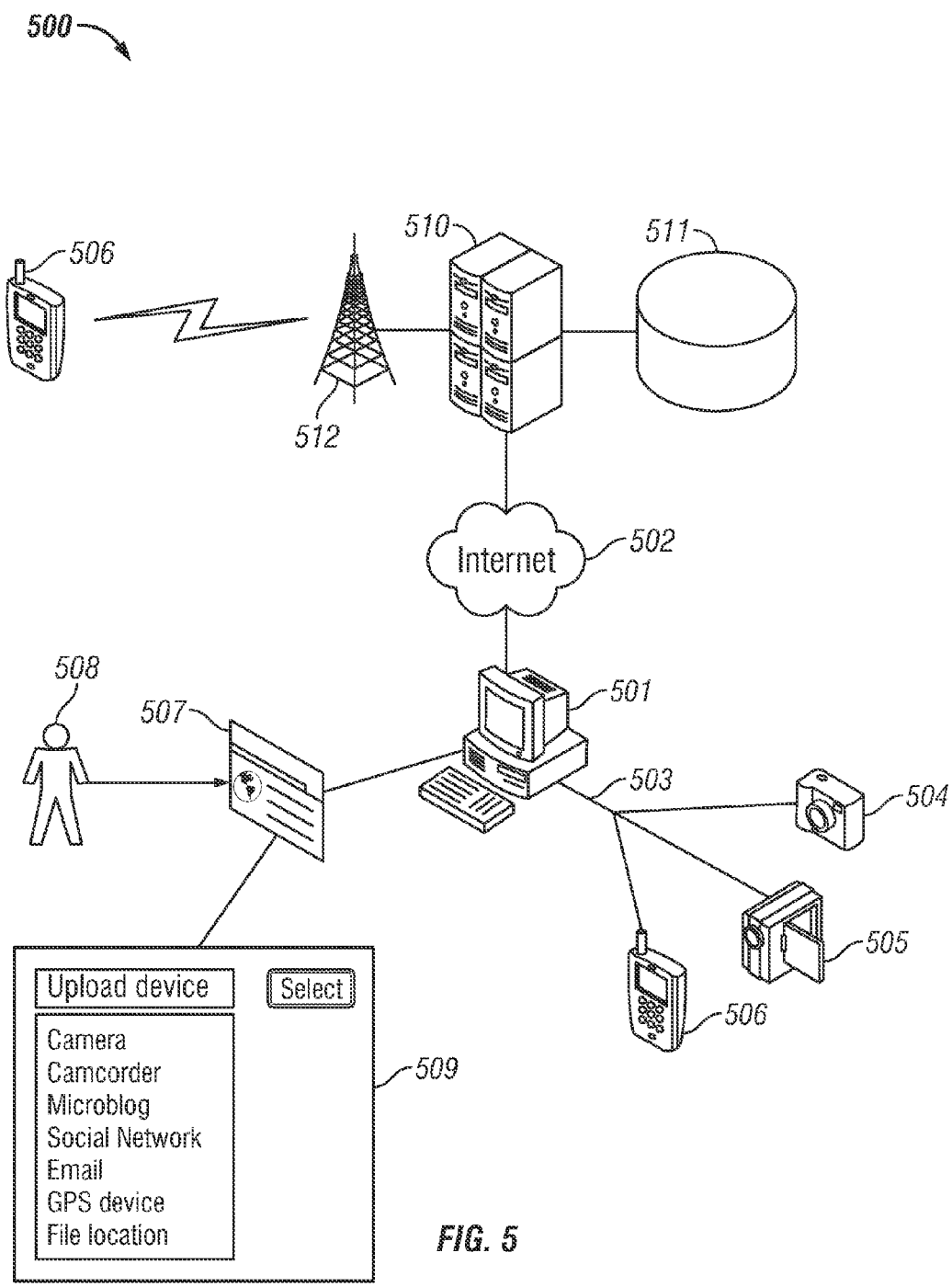
FIG. 5 is an exemplary diagram of a system for automatically generating an electronic journal, including a user interface for uploading a variety of data, according to one aspect of the subject technology.

FIG. 5 is an exemplary diagram of a system 500 for automatically generating an electronic journal, including a user interface for uploading a variety of data, according to one aspect of the subject technology. System 500 may be one implementation of the components described with respect to FIG. 1. System 500 may include, for example, a computer 501 that may be connected to one or more local data devices and/or one or more remote data sources via a network 502, such as the Internet. Computer 501 may be a personal computer, server computer, smart phone, notepad computer, or similar device capable of connecting to one or more data devices and/or a network (for example, via a wired or wireless network connection, cellular connection, or the like). The local data devices may be connected to computer 501 by one or more data connections 503 (for example, USB, SATA, FireWire, SCSI, Bluetooth, network connection, or the like). In one aspect, image data may be received into computer 501 from a digital camera 504. In another aspect, video data may be received from a video camera 505. In a further aspect, image, video, and/or GPS data may be received from a smart device 506 (for example, a smart phone).

In one aspect, computer 501 may display a user interface 507 (for example, user interface 108) to be used by a user 508. User interface 507 may be used to upload and/or integrate a variety of recorded data (including, for example, digital photos, videos, GPS tracks, text messages, blog posts, social network posts, check-in applications, and the like). In one aspect, a data source selection screen 509 is displayed by user interface 507 and may include a selectable menu for the selection of a data source. On making a selection at selection screen 509, computer 501 may be configured to access one or more connected data sources and receive the recorded data. In one aspect, selection screen 509 may be used to download recorded data from, or upload recorded data to, a remote server 510. In one aspect, remote server 510 may store the recorded data on a database 511. In another aspect, user interface 507 may also be configured to connect system 500 (and/or, for example, data manager 101) with systems onto which data has previously been stored and/or uploaded for other purposes (for example, a social network). In some aspects, a connection from computer 501 to remote server 510 may require user 508 to provide authentication credentials to server 510.

In one aspect, recorded data may be received by and/or stored in a data cloud (for example, on a server 510 and/or a database 511). In one aspect, the system (for example, data manager 101) may be integrated with one or more services providers (for example, at Facebook, Twitter, Google Buzz, Flickr, and the like) to receive recorded data. Parameters may be set at user interface 507 for configuring the system on how data is collected and integrated with system 500 (and/or, for example, data manager 101). For example, a user may configure the cloud to automatically receive data, including a predetermined meta-data tag, when posted to a social network or other online image and/or video host. In another example, a smart device 506 (for example, a smart cell phone or GPS device) may be configured to automatically provide GPS location data to the system (for example, via a wireless or cellular connection 512) at predetermined intervals (for example, a GPS breadcrumb).

Figure 6:
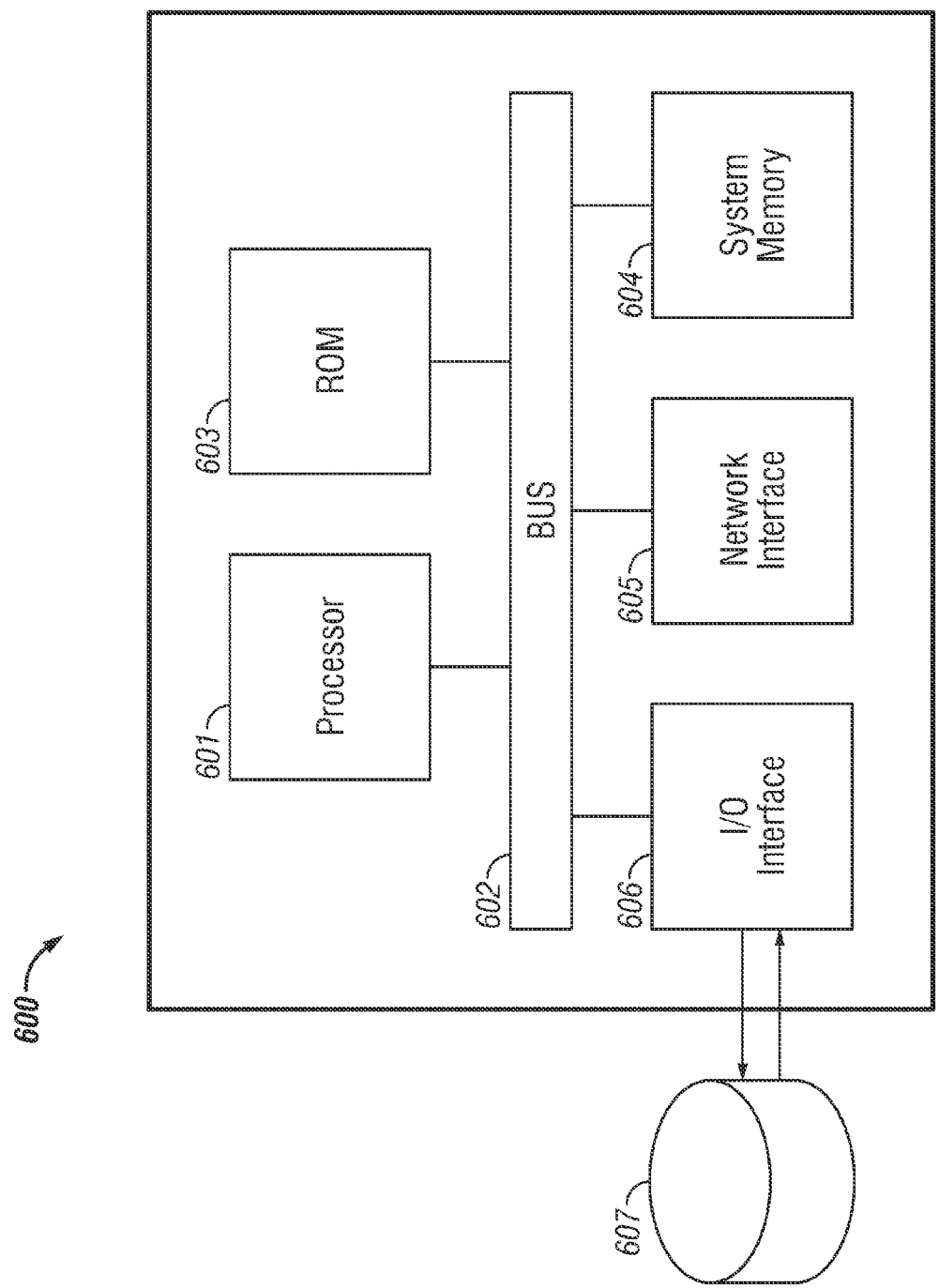
FIG. 6 is a diagram illustrating an exemplary server system for automatically generating an electronic journal, including a processor and other internal components, according to one aspect of the subject technology.

FIG. 6 is a diagram illustrating an exemplary server system for automatically generating an electronic journal, including a processor and other internal components, according to one aspect of the subject technology. In some aspects, a computerized device 600 (for example, computer 501, server 510, or data manager 101) includes several internal components such as a processor 601, a system bus 602, read-only memory 603, system memory 604, network interface 605, I/O interface 606, and the like. In one aspect, processor 601 may also be communication with a storage medium 607 (for example, a hard drive, database, or data cloud) via I/O interface 606. In some aspects, all of these elements of device 600 may be integrated into a single device. In other aspects, these elements may be configured as separate components.

Processor 601 may be configured to execute code or instructions to perform the operations and functionality described herein, manage request flow and address mappings, and to perform calculations and generate commands. Processor 601 is configured to monitor and control the operation of the components in server 600. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 601. Likewise, one or more sequences of instructions may be software stored and read from system memory 605, ROM 603, or received from a storage medium 607 (for example, via I/O interface 606). ROM 603, system memory 605, and storage medium 607 represent examples of machine or computer readable media on which instructions/code may be executable by processor 601. Machine or computer readable media may generally refer to any medium or media used to provide instructions to processor 601, including both volatile media, such as dynamic memory used for system memory 604 or for buffers within processor 601, and non-volatile media, such as electronic media, optical media, and magnetic media.

In some aspects, processor 601 is configured to communicate with one or more external devices (for example, via I/O interface 606). Processor 601 is further configured to read data stored in system memory 604 and/or storage medium 607 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like. Alternatively, one or more external devices may include an electronic device such as a digital camera, a digital audio player, a digital video recorder, and the like.

In some aspects, system memory 604 represents volatile memory used to temporarily store data and information used to manage device 600. According to one aspect of the subject technology, system memory 604 is random access memory (RAM) such as double data rate (DDR) RAM. Other types of RAM also may be used to implement system memory 504. Memory 604 may be implemented using a single RAM module or multiple RAM modules. While system memory 604 is depicted as being part of device 600, those skilled in the art will recognize that system memory 604 may be separate from device 600 without departing from the scope of the subject technology. Alternatively, system memory 604 may be a non-volatile memory such as a magnetic disk, flash memory, peripheral SSD, and the like.

I/O interface 606 may be configured to be coupled to one or more external devices, to receive data from the one or more external devices and to send data to the one or more external devices. I/O interface 606 may include both electrical and physical connections for operably coupling I/O interface 606 to processor 601, for example, via the bus 602. I/O interface 606 is configured to communicate data, addresses, and control signals between the internal components attached to bus 602 (for example, processor 601) and one or more external devices (for example, a hard drive). I/O interface 606 may be configured to implement a standard interface, such as Serial-Attached SCSI (SAS), Fiber Channel interface, PCI Express (PCIe), SATA, USB, and the like. I/O interface 606 may be configured to implement only one interface. Alternatively, I/O interface 606 may be configured to implement multiple interfaces, which are individually selectable using a configuration parameter selected by a user or programmed at the time of assembly. I/O interface 606 may include one or more buffers for buffering transmissions between one or more external devices and bus 602 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The previous description has provided examples of using GPS signals, coordinates, devices, and tracks. However, as previously described, one or more other technologies and location-aware devices may be used in addition to or instead of GPS-related information and devices to determine a geographic location of a user. Thus, it should be understood that location coordinates can be analyzed as discussed herein to identify travel routes and events regardless of the technology or technologies used to determine the location coordinates. Furthermore, regardless of how location data is obtained, appropriate efforts can be taken to protect a user's privacy and other rights. For example, collection and use of location data may be on an opt-in basis so that data is not collected at all unless the user has granted permission, with the location data stored and handled in a secure manner. When collected, the location and other data can be used according to user preferences and/or permissions. For example, sharing of the location data and information derived from the location data (for example, the storyline and/or journal created by the subject technology) may be controlled by the user.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A non-transitory machine-readable medium including machine-executable instructions for a method of generating an electronic journal, the method comprising:
    receiving location data from one or more data devices;
    determining a travel route from the location data;
    receiving a plurality of digital pictures generated along the travel route;
    determining a cluster of digital pictures in the plurality of digital pictures are of a same image subject based on timestamps of the digital pictures and an image comparison of the digital pictures;
    extracting meta-data from the cluster of digital pictures; and
    correlating the meta-data from the cluster of digital pictures with the location data associated with the travel route to generate one or more travel events corresponding to the cluster of digital pictures, each travel event including one or more data recordings associated with a location on the travel route.

2. The machine-readable medium of claim 1, further comprising;
    providing an interactive map including the travel route and one or more event representations positioned along the travel route, each of the event representations operable to, when selected, display one or more respective travel events.

3. The machine-readable medium of claim 2, further comprising:
    receiving one or more text messages associated with the travel route.

4. The machine-readable medium of claim 3, further comprising:
    generating a narrative associated with the one or more travel events, the narrative including sequentially displaying at least a portion of the one or more text messages apart from the interactive map.

5. The machine-readable medium of claim 4, further comprising:
    determining a mode of transportation from the location data; and
    automatically including text related to the mode of transportation with the narrative.

6. The machine-readable medium of claim 2, wherein the interactive map is a three-dimensional geographic representation of the travel route.

7. The machine-readable medium of claim 1, wherein the meta-data includes one or more first timestamps, and correlating the meta-data from the cluster of digital pictures with the location data associated with the travel route includes associating a first timestamp with a second timestamp associated with the location data.

8. The machine-readable medium of claim 7, wherein a travel event is generated when two or more of the first timestamps are substantially within a same predetermined frame of time, the predetermined time frame being substantially at a respective second timestamp.

9. The machine-readable medium of claim 1, wherein the one or more data devices includes a smart phone and a remote server, wherein the location data is received from the smart phone, and the one or more data recordings is received from the remote server.

10. The machine-readable medium of claim 1, wherein the location data is GPS location data.

11. A computer implemented method of generating an electronic journal, comprising:
    receiving, by one or more computing devices, location data from one or more data devices;
    determining, by the one or more computing devices, a travel route and a travel period from the location data;
    receiving, by the one or more computing devices, one or more digital pictures associated with one or more activities related to the travel route;
    extracting, by the one or more computing devices, meta-data from the one or more digital pictures, the meta-data including one or more timestamps;
    correlating, by the one or more computing devices, the meta-data with the location data associated with the travel route and the travel period to generate one or more travel events; and
    generating, by the one or more computing, devices, a chronological storyline representative of the one or more travel events along the travel route and operable to be displayed in combination with an interactive map representative of the travel route, wherein the chronological storyline displays at least one of the one or more digital pictures in connection with displaying the one or more travel events.

12. The computer implemented method of claim 11, wherein the one or more timestamps associated with the meta-data comprises one or more first timestamps, and correlating the meta-data with the location data associated with the travel route and the travel period includes associating a first timestamp with a second timestamp associated with the location data.

13. The computer implemented method of claim 12, wherein a travel event is generated when two or more of the first timestamps are substantially within a same predetermined frame of time, the predetermined time frame being substantially at a respective second timestamp.

14. The computer implemented method of claim 11, further comprising:
    receiving one or more text messages associated with the travel route.

15. The computer implemented method of claim 14, further comprising:
    generating a narrative associated with the chronological storyline, the narrative including sequentially displaying at least a portion of each of the one or more text messages according to a respective timestamp.

16. The computer implemented method of claim 11, further comprising:
   determining a mode of transportation from the location data; and
   automatically including text related to the mode of transportation with the chronological storyline.

17. The computer implemented method of claim 11, wherein extracting the meta-data from the one or more digital pictures includes, for each of the one or more digital pictures, determining a subject of the image by an image recognition process.

18. The computer implemented method of claim 17, wherein correlating the meta-data with the location data associated with the travel route includes associating a respective subject with a known location associated with the travel route.

19. The computer implemented method of claim 17, wherein a travel event is generated when two or more respective subjects or digital pictures are substantially the same.

20. The computer implemented method of claim 11, wherein displaying the one or more travel events comprises:
   receiving a selected location of the travel route; and
   displaying a dialog at the selected location in response to receiving the selected location, wherein the dialog displays the at least one of the one or more digital pictures.

21. The computer implemented method of claim 11, wherein receiving the location data from the one or more data devices comprises receiving a plurality of first GPS location points representative of a first travel route from a first data device, and receiving a plurality of second GPS location points representative of a second travel route from a second data device, the plurality of second GPS location points being fewer in number than the plurality of first GPS location points, and wherein one or more first travel events associated with the first device is not associated with the second device, the method further comprising:
   on making a determination that the second travel route is substantially similar to the first travel route, associating the one or more first travel events with the second data device.

22. The computer implemented method of claim 11, wherein the location data is GPS location data.

23. A system for generating an electronic journal, comprising:
   one or more processors;
   a memory including software that, when executed by the one or more processors, causes the one or more processors to:
      receive GPS data from one or more location-aware data devices;
      determine a travel route and a travel period from the GPS data;
      receive one or more digital pictures associated with one or more activities related to the travel route;
      extract image data from the one or more digital pictures, the image data including one or more timestamps;
      correlate the image data with the travel route and the travel period to generate one or more travel events occurring during the travel period; and
      generate a chronological storyline representative of the one or more travel events along the travel route and operable to be displayed in combination with an interactive map representative of the travel route, wherein the chronological storyline displays at least one of the one or more digital pictures in connection with displaying the one or more travel events.

24. The system of claim 23, wherein the software, when executed, further causes the one or more processors to;
   receive one or more text entries, each of the text entries including a text entry time; and
   correlate the one or more text entries with one of the travel route, travel period, and one or more travel events to generate a narrative associated with the chronological storyline, the narrative including at least a portion of each of the one or more text entries according to a respective text entry time.

25. The system of claim 23, wherein the software, when executed, further causes the one or more processors to:
   determine a mode of transportation from the location data; and
   automatically include text related to the mode of transportation with the chronological storyline.

* * * * *